(12) United States Patent
Yang et al.

(10) Patent No.: US 8,963,850 B2
(45) Date of Patent: Feb. 24, 2015

(54) METHOD FOR DETERMINING SCANNING TIMES OF TOUCH DRIVING PULSE IN A TOUCH PANEL

(75) Inventors: Chun-Wei Yang, Hsin-Chu (TW);
Chun-Lung Hung, Hsin-Chu (TW);
Yu-Min Hsu, Hsin-Chu (TW);
Yung-Tse Cheng, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 959 days.

(21) Appl. No.: 13/098,063

(22) Filed: Apr. 29, 2011

(65) Prior Publication Data

US 2012/0154322 A1     Jun. 21, 2012

(30) Foreign Application Priority Data

Dec. 17, 2010   (TW) ............................... 99144536 A

(51) Int. Cl.
*G06F 3/041* (2006.01)
(52) U.S. Cl.
CPC ............ *G06F 3/0416* (2013.01); *G06F 3/0412* (2013.01)
USPC .......................................... 345/173; 345/204
(58) Field of Classification Search
USPC ........................................................ 345/173
See application file for complete search history.

(56) References Cited

U.S. PATENT DOCUMENTS

| 5,923,320 | A | 7/1999 | Murakami et al. |
| 8,125,456 | B2 * | 2/2012 | Krah et al. ..................... 345/173 |
| 2004/0227743 | A1 * | 11/2004 | Brown .......................... 345/204 |
| 2005/0162410 | A1 | 7/2005 | Johnson et al. |
| 2007/0262966 | A1 | 11/2007 | Nishimura et al. |
| 2010/0265199 | A1 | 10/2010 | Chen |
| 2011/0109568 | A1 * | 5/2011 | Wu et al. ....................... 345/173 |

FOREIGN PATENT DOCUMENTS

CN            101866210            10/2010

\* cited by examiner

*Primary Examiner* — Kathy Wang-Hurst
*Assistant Examiner* — Jose Soto Lopez
(74) *Attorney, Agent, or Firm* — WPAT, PC; Justin King

(57) ABSTRACT

A method for determining scanning times of touch driving pulse in a touch panel includes steps of: judging a current gate line scan period is in which one of a data updating time period and a blanking time period; if the current gate line scan period is in the data updating time period, setting a scanning times of touch driving pulse in the current gate line scan period to be a first value; and if the current gate line scan period is in the blanking time period, setting the scanning times of touch driving pulse in the current gate line scan period to be a second value. The first value is different from the second value, and a time for touch driving pulse scanning is non-overlapped with another time for providing display data to data lines of the touch panel in each scan line scan period.

9 Claims, 4 Drawing Sheets

METHOD FOR DETERMINING SCANNING TIMES OF TOUCH DRIVING PULSE IN A TOUCH PANEL

TECHNICAL FIELD

The disclosure relates to touch panel technologies, and more particularly to a method for determining scanning times of touch driving pulse in a touch panel.

BACKGROUND

With the development of science and technology, flat panel display devices (e.g., liquid crystal display devices) have many advantages of high display quality, small volume, light weight and wide application range and thus are widely used in consumer electronics products such as mobile phones, laptop computers, desktop computers and televisions, etc. Moreover, the liquid crystal display devices have evolved into a mainstream display in place of cathode ray tube (CRT) displays.

In another aspect, the touch input device provides a new human machine interface and is more intuitive and humanity in use. Moreover, the touch input device can be integrated with a flat panel display device to constitute a touch panel, so that the touch panel is endowed with display and touch input functions.

Referring to FIG. 1, schematic waveform diagrams of multiple signals associated with a touch panel in the prior art are shown. In particular, a single frame period of the touch panel generally includes multiple gate line scan periods (FIG. 1 only shows two gate line scan periods for the purpose of illustration). As to the touch panel with a frame refreshing rate of 60 Hz and a native resolution of 1366×768, a single gate line scan period, i.e., the time duration from a falling edge of a pulse in a scan control clock signal YCLK to a rising edge of the next pulse in the scan control clock signal YCLK may be set as 20 microseconds (µs). In some gate line scan periods, a source driving circuit in the touch panel would provide data lines with display data for charging or discharging corresponding pixels to respective data voltages, a time length of such charging or discharging operation can termed as data coupling time (e.g., about 13 µs).

Generally, a common voltage on a common electrode in the touch panel would be caused disturbance during the data coupling time, which would influence the touch sensors in the touch panel and therefore the touch driving pulse (e.g., having a pulse width of about 2.5 µs) must be non-overlapped with the data coupling time. However, since the data coupling time is excessive long and the amounts of touch driving pulse in respective gate line scan periods are the same in the prior art, resulting in the touch control scanning frame rate of the touch panel is excessive low and thus the touch detection sensitivity is degraded. In addition, as seen from FIG. 1, as to the situation of an angling control signal YV1C being provided to change the signal waveforms on the respective gate lines, the touch driving pulse further must be non-overlapped with a variation time (e.g., about 3.5 µs) of the angling control signal YV1C. Herein, the variation time is defined as the time duration from a rising edge of a certain pulse of the angling control signal YV1C to a rising edge of the nearest pulse of the scan control clock signal YCLK.

SUMMARY OF EMBODIMENTS

Therefore, the disclosure is directed to a method for determining scanning times of touch driving pulse in a touch panel, so as to increase the touch scanning frame rate and thereby achieve the purpose of improving the touch detection sensitivity.

In one aspect, a method for determining scanning times of touch driving pulse in a touch panel, in accordance with an embodiment, is provided. The touch panel includes multiple gate lines and multiple data lines for providing display data. A frame period of the touch panel includes multiple gate line scan periods. Some of the gate line scan periods constitute a data updating time period, and the other of the gate line scan periods constitute a blanking time period. The display data are changed in the data updating time period while unchanged in the blanking time period. In the embodiment, the method for determining scanning times of touch driving pulse includes the following steps of: judging a current gate line scan period is in which one of the data updating time period and the blanking time period; setting a scanning times of touch driving pulse in the current gate line scan period to be a first value if the current gate line scan period is in the data updating time period; and setting the scanning times of touch driving pulse in the current gate line scan period to be a second value if the current gate line scan period is in the blanking time period. The first value is different from the second value, and a time for touch driving pulse scanning is non-overlapped with another time for providing the display data to the data lines of the touch panel (i.e., generally a data coupling time).

In one embodiment, the method for determining scanning times of touch driving pulse further includes steps of: obtaining a touch scanning time of performing one times touch driving pulse scanning; obtaining a data coupling time of providing the display data to the data lines in the gate line scan period; and determining the first value and the second value based on the gate line scan period, the touch scanning time and the data coupling time. More specifically, the determining of the first value may include the steps of: obtaining a first remaining time by subtracting the data coupling time from the gate line scan period; and taking the maximum amount of the touch scanning time containable in the first remaining time as the maximum of the first value. The determining of the second value may include the step of: taking the maximum amount of the touch scanning time containable in the gate line scan period as the maximum of the second value.

In one embodiment, in the step of determining the first value and the second value based on the touch scanning time, the gate line scan period and the data coupling time, a variation time of a signal for waveform modulation of signals on the respective gate lines further is taken in consideration. Correspondingly, the determining of the first value may include steps of: obtaining a first remaining time by subtracting the data coupling time and the variation time from the gate line scan period; and taking the maximum amount of the touch scanning time containable in the first remaining time as the maximum of the first value. The determining of the second value may include steps of: obtaining a second remaining time by subtracting the variation time from the gate line scan period; and taking the maximum amount of the touch scanning time containable in the second remaining time as the maximum of the second value.

In one embodiment, the one times touch driving pulse scanning is for scanning one touch detection point, or for scanning multiple touch detection points arranged in a particular manner instead.

Owing to the frame period being demarcated into the data updating time period and the blanking time period, and the scanning times of touch driving pulse in each gate line scan period of the data updating time period being set to be the first value, while the scanning times of touch driving pulse in each gate line scan period of the blanking time period being set to be the second value (e.g., greater than the first value), the touch scanning frame rate can be improved and therefore the purpose of improving the touch detection sensitivity is achieved.

BRIEF DESCRIPTION OF THE DRAWINGS

The above objects and advantages will become more readily apparent to those ordinarily skilled in the art after reviewing the following detailed description and accompanying drawings, in which.

DETAILED DESCRIPTION OF EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
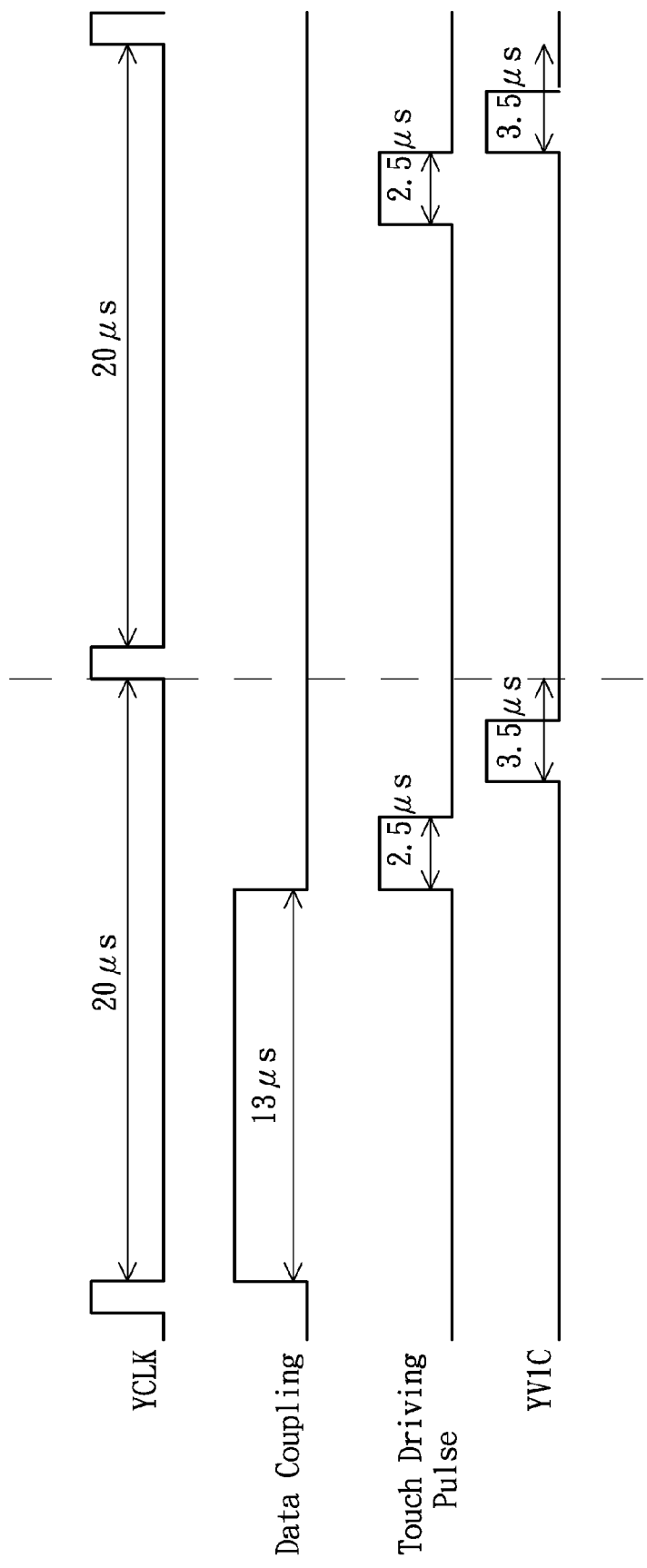
FIG. 1 shows schematic waveform diagrams of multiple signals associated with a touch panel.
Figure 2:
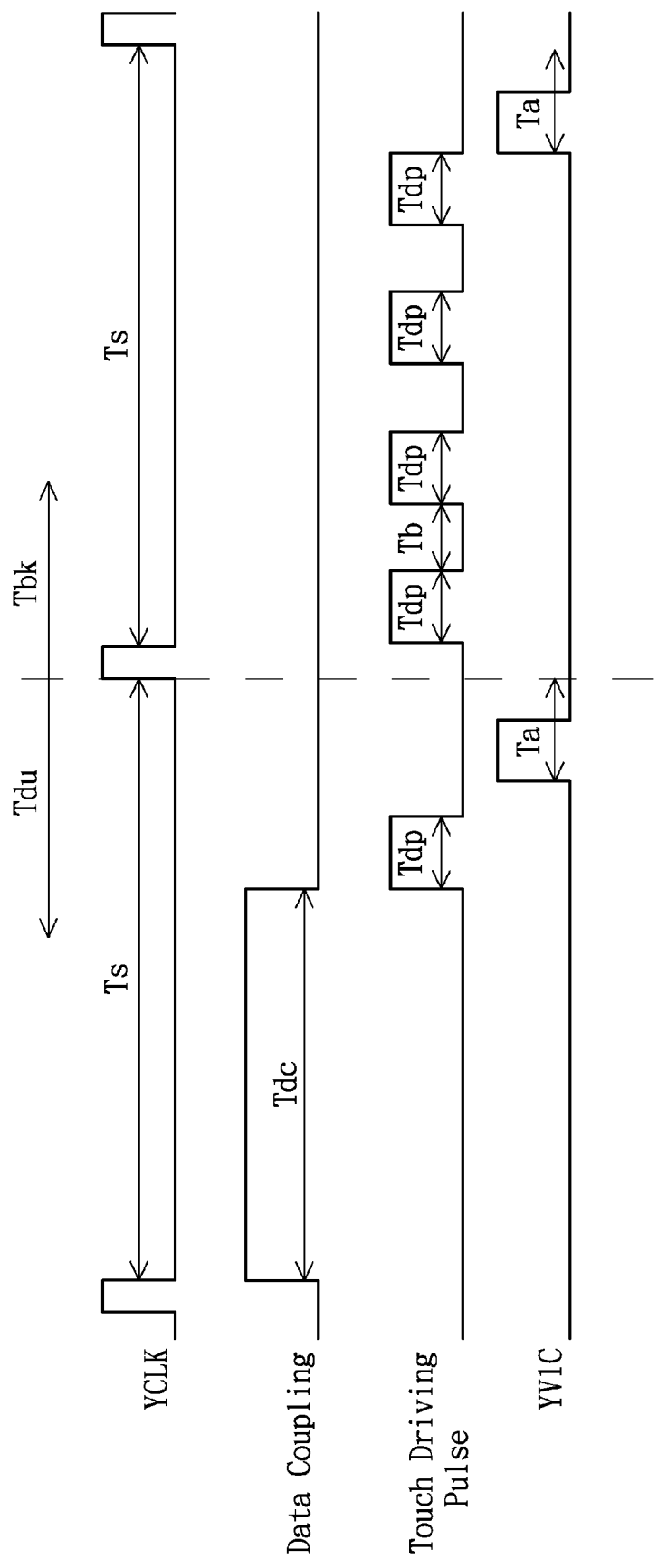
FIG. 2 shows schematic waveforms of multiple signals of a touch panel in accordance with an embodiment.

Referring to FIG. 2, schematic waveforms of multiple signals of a touch panel in accordance with an embodiment is shown. As illustrated in FIG. 2, a single frame period of the touch panel (not shown) includes multiple gate line scan periods Ts, some (FIG. 2 only shows one for the purpose of illustration) of the gate line scan periods Ts constitute a data updating time period Tdu, and the other (FIG. 2 only shows one for the purpose of illustration) of the gate line scan periods Ts constitute a blanking time period Tbk. It is well known that, a touch panel generally includes multiple gate lines, multiple data lines for providing display data for the use of image display, and multiple pixels electrically coupled to the gate lines and the data lines. A gate line scan period is defined as the time duration from a falling edge of a certain pulse in a scan control clock signal YCLK to a rising edge of the next pulse in the scan control clock signal YCLK. Moreover, the touch panel includes multiple touch detection points, and such touch detection points are arranged in a matrix or other manner. The touch detection points generally are in the form of touch sensors in the touch panel.

During each of the gate line scan periods Ts in the data updating time period Tdu, a source driving circuit of the touch panel would provide the display data to the data lines for charging or discharging the pixels to corresponding data voltages (i.e., the display data on the data lines would be changed), so that there is a data coupling time Tdc. While during each of the gate line scan periods Ts in the blanking time period Tbk, the source driving circuit of the touch panel is not required to provide any display data to the data lines for charging or discharging pixels, the display data on the data lines are substantially unchanged, and therefore there is not the data coupling time Tdc. Moreover, as seen from FIG. 2, during each of the gate line scan periods Ts in the frame period (including the data updating time period Tdu and the blanking time period Tbk), there is a variation time Ta of an angling control signal YV1C. Herein, the angling control signal YV1C is for modulating the signal waveforms on the respective gate lines, the variation time Ta is defined as a time duration of a rising edge of a certain pulse of the angling control signal YV1C to a rising edge of the nearest pulse of the scan control clock signal YCLK.

Figure 3:
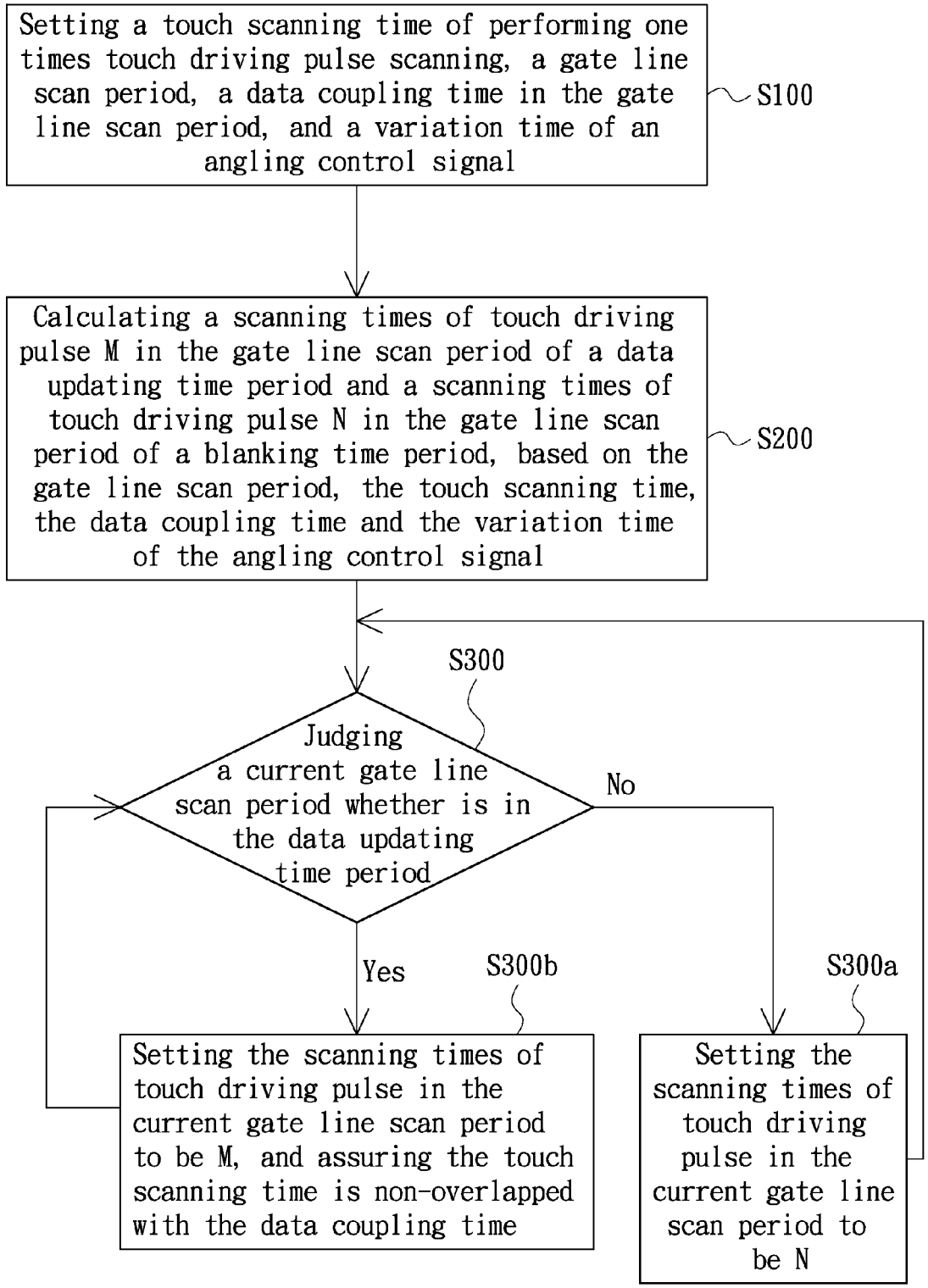
FIG. 3 shows a flowchart of a method for determining scanning times of touch driving pulse in the touch panel in accordance with an embodiment.

Referring to FIG. 2 and FIG. 3 together, FIG. 3 showing a flowchart of a method for determining scanning times of touch driving pulse in the touch panel in accordance with an embodiment. In particular, the method for determining scanning times of touch driving pulse in the illustrative embodiment may include the steps S100, S200, S300, S300a and S300b as illustrated in FIG. 3.

Firstly, in the step S100, a touch scanning time Tdp of performing one time touch driving pulse scanning, the gate line scan period Ts, the data coupling time Tdc in the gate line scan period Ts, and the variation time Ta of the angling control signal YV1C are set up. Herein, one times touch driving pulse scanning is for scanning one touch detection point, or for scanning multiple touch detection points arranged in a particular manner (e.g., multiple adjacent touch detection points) instead. As to a touch panel with a frame refreshing rate of 60 Hz and a native resolution of 1366×768, the gate line scan period Ts for example is set to be 20 microseconds (μs), the data coupling time Tdc for example is set to be 13 μs, the touch scanning time Tdp for example is set to be 2.5 μs, and the variation time Ta of the angling control signal YV1C for example is set to be 3.5 μs. It is indicated that, the above values of the gate line scan period Ts, the data coupling time Tdc, the touch scanning time Tdp and the variation time Ta of the angling control signal YV1C only are illustrative and for the convenience of description in the following, and thus not to limit the present invention.

Subsequently, in the step S200, the scanning times of touch driving pulse M in the gate line scan period Ts of the data updating time period Tdu and the scanning times of touch driving pulse N in the gate line scan period Ts of the blanking time period Tbk are calculated based on the gate line scan period Ts, the touch scanning time Tdp, the data coupling time Tdc and the variation time Ta of the angling control signal YV1C.

In particular, for the calculation of the scanning times of touch driving pulse M in the gate line scan period Ts of the data updating time period Tdu, the data coupling time Tdc and the variation time Ta of the angling control signal YV1C both are subtracted from the gate line scan period Ts to firstly obtain a remaining time (for example (20 μs−13 μs−3.5 μs)=3.5 μs), and then the maximum amount (for example (3.5 μs/2.5 μs)=1) of the touch scanning time Tdp containable in the remaining time is taken as the maximum of M, FIG. 2 illustrates the case of M=1.

For the calculation of the scanning times of touch driving pulse N in the gate line scan period Ts of the blanking time period Tbk, the variation time Ta of the angling control signal YV1C is subtracted from the gate line scan period Ts to firstly obtain a remaining time (for example (20 μs−3.5 μs)=16.5 μs), and then the maximum amount of the touch scanning time Tdp containable in the remaining time is taken as the maximum of N. Herein, the maximum amount is (16.5 μs/2.5 μs)=6, since two adjacent touch scanning times Tdp generally have a time interval Tb (for example 2 μs) existed therebetween, and therefore FIG. 2 illustrates the case of N=4.

Afterwards, in the step S300, a current gate line scan period Ts is judged whether in the data updating time period Tdu. If the current gate line scan period Ts is in the blanking time period Tbk rather than the data updating time period Tdu (i.e., the judging result is NO), the scanning times of touch driving pulse in the current gate line scan period Ts is set to be N, e.g., 4 times as illustrated in FIG. 2 (step S300a). Whereas, if the current gate line scan period Ts is in the data updating time period Tdu (i.e., the judging result is YES), the scanning times of touch driving pulse in the current gate line scan period is set to be M, e.g., 1 times as illustrated in FIG. 2 (step S300b).

Figure 4:
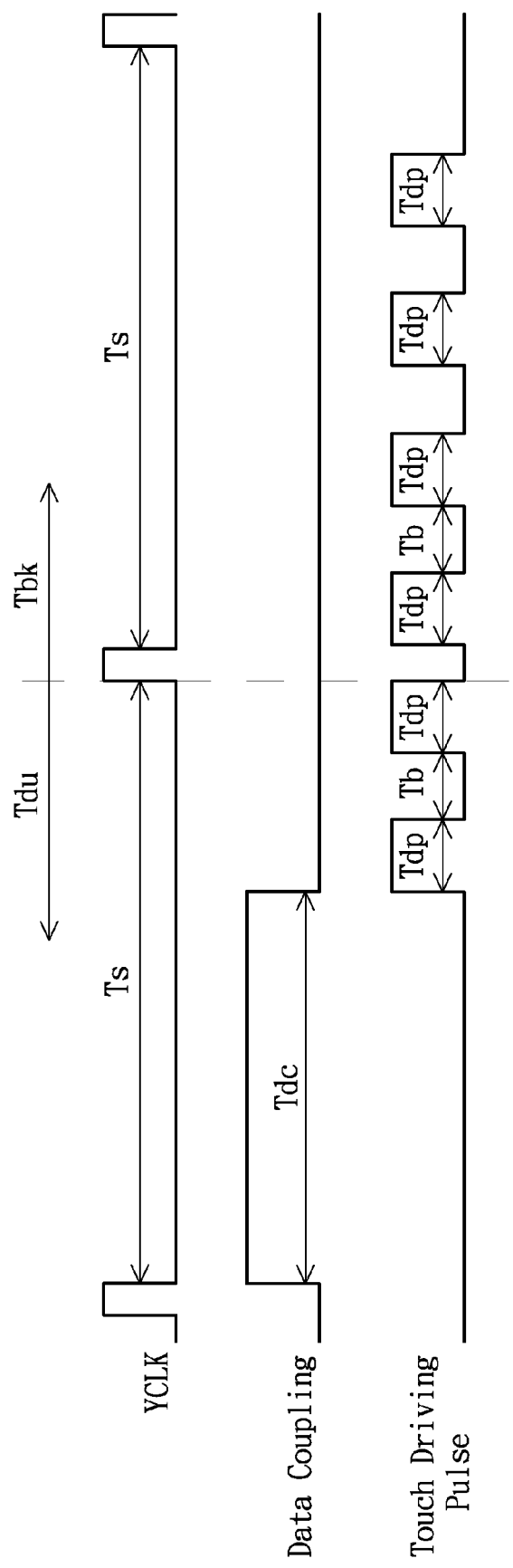
FIG. 4 shows a situation associated with the setting of the scanning times of touch driving pulse in each gate line scan period of the frame period (including the data updating time period and the blanking time period) without or no need of consideration of the influence of the variation time to the touch sensors in the touch panel

Referring to FIG. 4, showing a situation associated with the setting of the scanning times of touch driving pulse in each gate line scan period Ts of the frame period (including the data updating time period Tdu and the blanking time period Tbk) without or no need of consideration of the influence of the variation time Ta to the touch sensors in the touch panel. As illustrated in FIG. 4, in the data updating time period Tdu, since Ts−Tdc=20 µs−13 µs=7 µs, the scanning times of touch driving pulse M in the gate line scan period of the data updating time period Tdu can be set to be (7 µs/2.5 µs)=2. In the blanking time period Tbk, since Ts=20 µs, and (20 µs/2.5 µs)=8, when the time interval Tb (for example 2 µs) of each two adjacent touch scanning time Tdp is taken in consideration, the scanning times of touch driving pulse N in the gate line scan period Ts of the blanking time period Tbk can be set to be 4 like the illustration of FIG. 2.

It is noted that, in the above embodiments, since the scanning times of touch driving pulse M, N in the gate line scan periods Ts of the data updating time period Tdu or the blanking time period Tbk is relevant to the gate line scan period Ts, the touch scanning time Tdp and the data coupling time Tdc, even further is relevant to other parameters such as the variation time Ta of the angling control signal YV1C, and such relevant parameters may have different setting values in different touch panels, therefore the designer can suitably set the values of the scanning times of touch driving pulse M, N according to actual application requirement.

Sum up, in the various embodiments, owing to the frame period being demarcated into the data updating time period and the blanking time period, and the scanning times of touch driving pulse in each gate line scan period of the data updating time period being set to be the first value while the scanning times of touch driving pulse in each gate line scan period of the blanking time period being set to be the second value (e.g., greater than the first value), the touch scanning frame rate can be improved and therefore the purpose of improving the touch detection sensitivity is achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for determining scanning times of touch driving pulse in a touch panel, wherein the touch panel comprises a plurality of gate lines and a plurality of data lines for providing display data, a frame period of the touch panel comprises a plurality of gate line scan periods, some of the gate line scan periods constitute a data updating time period and the other of the gate line scan periods constitute a blanking time period, the display data are changed in the data updating time period while unchanged in the blanking time period, the method comprising steps of:

judging a current gate line scan period is in which one of the data updating time period and the blanking time period;

setting a scanning times of touch driving pulse in the current gate line scan period to be a first value if the current gate line scan period is in the data updating time period;

setting the scanning times of touch driving pulse in the current gate line scan period to be a second value if the current gate line scan period is in the blanking time period;

obtaining a touch scanning time of performing one times touch driving pulse scanning;

obtaining a data coupling time of providing the display data to the data lines in the gate line scan period; and determining the first value and the second value based on the gate line scan period, the touch scanning time and the data coupling time;

wherein the first value is different from the second value, and the touch scanning time is non-overlapped with the data coupling time.

2. The method as claimed in claim 1, wherein the step of determining the first value and the second value based on the gate line scan period, the touch scanning time and the data coupling time comprises:

obtaining a first remaining time by subtracting the data coupling time from the gate line scan period; and taking the maximum amount of the touch scanning time containable in the first remaining time as the maximum of the first value.

3. The method as claimed in claim 1, wherein the step of determining the first value and the second value based on the gate line scan period, the touch scanning time and the data coupling time comprises:

taking the maximum amount of the touch scanning time containable in the gate line scan period as the maximum of the second value.

4. The method as claimed in claim 1, wherein in the step of determining the first value and the second value based on the touch scanning time, the gate line scan period and the data coupling time, a variation time of a signal for waveform modulation of signals on the respective gate lines is further taken in consideration.

5. The method as claimed in claim 4, wherein the determining of the first value comprises:

obtaining a first remaining time by subtracting the data coupling time and the variation time from the gate line scan period; and taking the maximum amount of the touch scanning time containable in the first remaining time as the maximum of the first value.

6. The method as claimed in claim 4, wherein the determining of the second value comprises:

obtaining a second remaining time by subtracting the variation time from the gate line scan period; and taking the maximum amount of the touch scanning time containable in the second remaining time as the maximum of the second value.

7. The method as claimed in claim 1, wherein the one times touch driving pulse scanning is for scanning one touch detection point.

8. The method as claimed in claim 1, wherein the one times touch driving pulse scanning is for scanning a plurality of touch detection points arranged in a particular manner.

9. The method as claimed in claim 1, wherein each touch driving pulse in the current gate line scan period being in the data updating time period has a pulse width equal to that of each touch driving pulse in the current gate line scan period being in the blanking time period.

* * * * *